J. W. THROPP.
PINION.
APPLICATION FILED FEB. 14, 1918.
1,310,899.
Patented July 22, 1919.
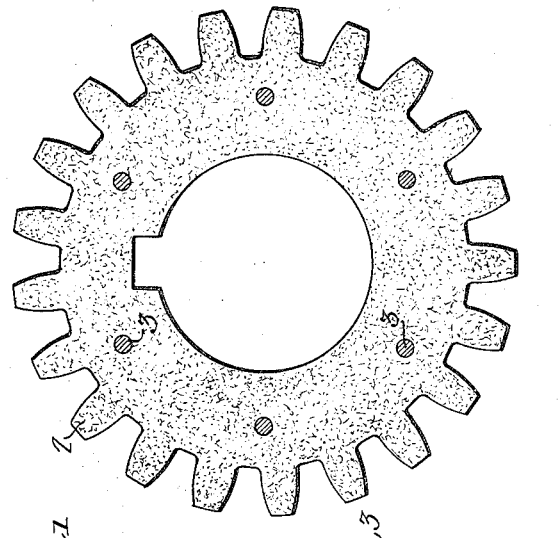
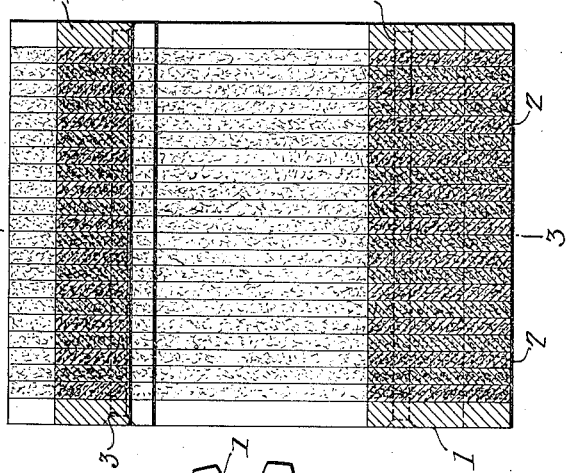
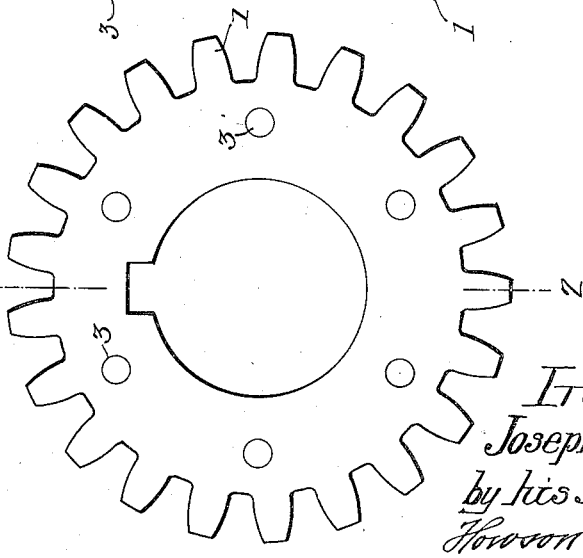
Inventor,
Joseph W. Thropp,
by his Attorneys,
Howson & Howson

UNITED STATES PATENT OFFICE.

JOSEPH W. THROPP, OF TRENTON, NEW JERSEY.

PINION.

1,310,899.   Specification of Letters Patent.   Patented July 22, 1919.

Application filed February 14, 1918. Serial No. 217,067.

*To all whom it may concern:*

Be it known that I, JOSEPH W. THROPP, a citizen of the United States, and a resident of Trenton, county of Mercer, State of New Jersey, have invented certain Improvements in Pinions, of which the following is a specification.

My invention relates to certain improvements in pinions made of sections of composition material held laterally by plates and bolts or rivets.

The object of the invention is to improve the wearing qualities of the pinion of the above mentioned type.

In the accompanying drawings:

Figure 1 is an end view of my improved pinion;

Fig. 2 is a longitudinal sectional view on the line 2—2, Fig. 1; and

Fig. 3 is a sectional view on the line 3—3, Fig. 2.

1, 1 are the two side plates of the pinion having gear teeth cut therein, in the present instance. 2 are the intervening sections of material, each section having gear teeth cut in the periphery, alining with the teeth of the plates. 3 are longitudinal rivets, or bolts, which extend through openings in the plates and in the intervening sections, clamping the plates and sections firmly together. The sections 2 are made of a composition consisting of asbestos fiber, short pieces of wire, preferably brass, long fibered cotton and a vulcanizable binder. In the present instance, this binder is a rubber composition and when the composition is placed in a mold under pressure and vulcanized, the binder, which permeates the mass of material, firmly holds the material together and makes a solid and substantial sheet, which, when shaped as shown in Fig. 3, will provide a section for a pinion, which, when the several sections are clamped together, as shown in Fig. 2, will withstand the strains to which a pinion of this type is subjected.

In some instances, I may use asbestos fiber along with a vulcanizable binder, or a mixture of asbestos fiber and long cotton fibers, with or without short metallic pieces, but I find that I attain the best results by the use of asbestos, cotton, and the short metallic pieces, such as fine wire.

While I prefer a vulcanizable rubber composition, it will be understood that other vulcanizable compositions, which are the equivalent of the rubber, may be used without departing from the essential features of the invention.

A built up pinion made in the manner above described will resist the strains to which it is subjected and the wear, due to the friction of the teeth meshing with the teeth of a gear wheel, will be minimized. It will also be comparatively noiseless when running.

While I have described the invention as particularly adapted to pinions, it will be understood that it may be used with gear wheels of any type.

I claim:

A pinion consisting of a series of sections clamped together, each section being made from a composition in which asbestos fiber is the base with sections of wire, cotton fiber and a vulcanizable rubber binding.

In witness whereof I affix my signature.

JOSEPH W. THROPP.